July 12, 1932.  F. S. CARTWRIGHT  1,867,061
GEAR SHIFT
Filed May 26, 1931
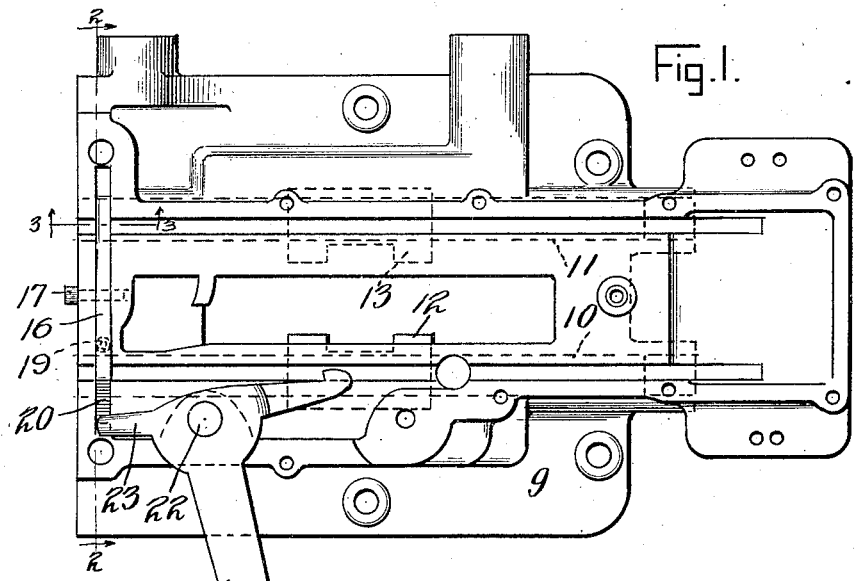
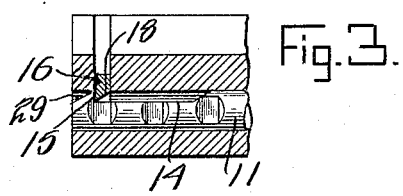
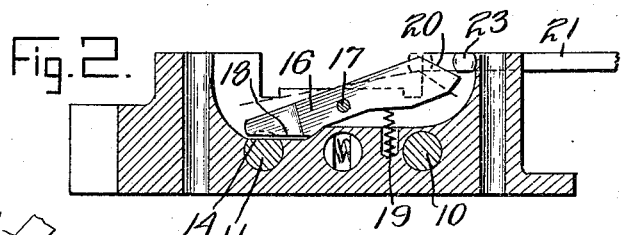
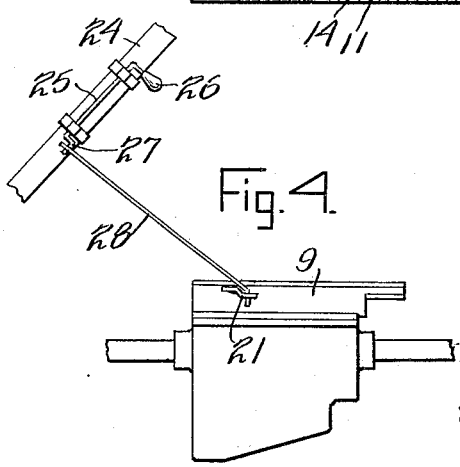
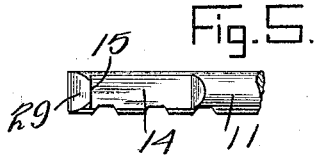
Inventor
Forest S. Cartwright
By
Attorney Patented July 12, 1932

1,867,061

UNITED STATES PATENT OFFICE

FOREST S. CARTWRIGHT, OF INDIANAPOLIS, INDIANA, ASSIGNOR TO CARTWRIGHT AUTOMATIC GEAR SHIFT CORPORATION, OF INDIANAPOLIS, INDIANA, A CORPORATION OF INDIANA

GEAR SHIFT

Application filed May 26, 1931. Serial No. 540,146.

This invention relates to automobile gear shifts and an object of the invention is to provide means for preventing shifting accidentally into reverse gear. In certain types of automobile gear shift mechanism such for example as that shown in my recent Patent No. 1,771,431 there is some danger of throwing the gear into reverse when passing from low gear to intermediate, particularly if the transmission grease is low or is thin.

The purpose of the present invention is to provide locking means which make it impossible to put the gears in reverse unless deliberately shifted to the reverse position.

Referring to the accompanying drawing, which is made a part hereof and on which similar reference characters indicate similar parts, Figure 1 is a plan view of a portion of the gear shifting housing with my invention adapted thereto, Figure 2, a section on line 2—2 of Figure 1,
Figure 3, a section on line 3—3 of Figure 1,
Figure 4, a side elevation showing manually operable means for shifting into reverse, and
Figure 5, a detail view of the end of one of the gear shifting rods.

In the drawing numeral 9 indicates a housing in which gear shifting rods 10 and 11 are mounted, these rods having notched yokes 12 and 13 in which a gear shifting element, not shown, engages to move the rods forward and backward to the several positions indicating low, reverse, intermediate and high speed of the automobile. As shown the rods are in neutral position. When the rod 11, for example, is moved to the left it is moved to low position and when moved to the right is moved to reverse position. Mechanism for locking it against movement to the reverse position will now be described. The upper side of the gear shift rod 11 is flattened as shown at 14 for a short distance and is provided with a sharp shoulder 15. A latch 16 is pivoted at 17 to the housing 9. This latch has a beveled portion 18 which seats on the flat surface 14 on the rod 11. A spring 19 is seated in a depression in the housing 9 and bears against the under side of the end of the latch to hold the opposite end down against the flat surface 14 on the rod 11. The flat surface 14 permits the rod 11 to move forward to the low gear position but the shoulder 15 engaging the latch 16 locks this rod against movement to the rear to reverse gear position. The end of the latch 16 opposite the rod 11 is beveled at 20.

A lever 21 is pivoted at 22 to the frame of the machine and has a short arm 23 which engages the beveled surface 20 to rock the latch and move it out of engagement with the shoulder 15. The lever 21 is manually operated from the steering wheel 24 of the automobile, the operating connection consisting of a rod 25 having a suitable handle 26 on its upper end and a crank 27 on its lower end. A link 28 connects the crank 27 with the outer end of the lever 21. The operator of the machine may rock the rod 25 and through the connection just described will rotate the lever 21 on its pivot in a clockwise direction. The arm 23 engaging the beveled edge 20 rocks the latch 16 in a clockwise direction to lift it out of engagement with the shoulder 15. When in this position the rod 11 may be freely shifted to the right to reverse gear position.

The end of the rod 11 is beveled at 29 so that it may be freely moved from reverse to neutral position, the beveled end lifting the latch 16 to permit it to move to this position.

It will be seen from the construction so far described that the lever 21 must be deliberately, manually operated before the gear shifting rod 11 can move to reverse gear position.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim is new and desire to secure by Letters Patent, is:

1. In an automobile gear shift having a pair of rods movable axially to position automobile gears in low, reverse, intermediate and high gear positions, one of said rods being notched and being engageable by a latch for preventing its being accidentally removed to reverse gear position, manually operable means for disengaging said latch to permit the rod to be moved to reverse gear position, means on the steering column of the automobile for operating said latch, and operable connection from said means to the said gear shifting rod releasing means, substantially as set forth.

2. In an automobile gear shift having a pair of rods movable axially to position automobile gears in low, reverse, intermediate or high gear positions, a latch engageable with one of said rods to prevent its being moved in one direction, the rod being notched to permit it to move freely in the other direction and manually operable means for disengaging said latch to permit the rod to be moved in either direction, substantially as set forth.

3. In an automobile gear shift having a pair of rods movable axially to position automobile gears in low, reverse, intermediate or high gear positions, a latch engageable with one of said rods to prevent its being moved in one direction, the rod being notched to permit it to move freely in the other direction, and manually operable means for disengaging said latch to permit the rod to be moved in either direction, the end of said notched rod being beveled to permit it to slide freely under said latch and restore the latch to locking position, substantially as set forth.

4. In an automobile gear shift having a pair of rods movable axially to position automobile gears in low, reverse, intermediate and high gear positions, one of said rods being notched and being engageable by a latch for preventing its being accidently removed to the reverse gear position, and manually operable means connected to the steering column of the automobile for disengaging said latch to permit the rod to be moved to reverse gear position, substantially as set forth.

In witness whereof, I have hereunto set my hand and seal at Indianapolis, Indiana, this 18th day of May, A. D. nineteen hundred and thirty-one.

FOREST S. CARTWRIGHT.